US010454756B2

(12) United States Patent
Albrecht et al.

(10) Patent No.: US 10,454,756 B2
(45) Date of Patent: Oct. 22, 2019

(54) WEARABLE GROUP COMMUNICATION DEVICE BYPASS CONNECTIVITY (71) Applicant: Orion Labs, San Francisco, CA (US)

(72) Inventors: Greg Albrecht, San Francisco, CA (US); Jesse Robbins, San Francisco, CA (US); Star Simpson, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 130 days.

(21) Appl. No.: 15/275,946

(22) Filed: Sep. 26, 2016

(65) Prior Publication Data

US 2017/0093613 A1 Mar. 30, 2017

Related U.S. Application Data (60) Provisional application No. 62/232,659, filed on Sep. 25, 2015.

(51) Int. Cl.
*H04L 12/24* (2006.01)
*H04W 8/30* (2009.01)
*H04L 12/707* (2013.01)
*H04L 29/06* (2006.01)
*H04L 12/703* (2013.01)

(52) U.S. Cl.
CPC .......... *H04L 41/0659* (2013.01); *H04L 45/22* (2013.01); *H04L 45/28* (2013.01); *H04L 63/0428* (2013.01); *H04W 8/30* (2013.01)

(58) Field of Classification Search
CPC ............. H04W 24/08; H04W 52/0209; H04W 72/1268; H04W 76/027; H04W 76/048; H04W 76/23; H04W 76/28; H04W 40/02; H04W 84/18; H04L 41/0659; H04L 45/02; H04L 45/22; H04L 45/26; H04L 45/28; H04L 45/42; H04L 69/40
USPC ....... 370/252, 311, 328, 329, 338, 225, 242, 370/248
See application file for complete search history.

(56) References Cited

U.S. PATENT DOCUMENTS

2002/0191573 A1* 12/2002 Whitehill ................ H04L 45/28 370/338
2006/0098608 A1* 5/2006 Joshi ..................... H04W 40/02 370/338

(Continued)

*Primary Examiner* — Harun Chowdhury (57) ABSTRACT

Upon detection of a failure of a communication link between a remote management system and a communication node, a bypass link is established. The remote management system evaluates whether additional communication nodes can act as a bypass for management communications between the remote management system and the communication node whose management communication link has failed. The remote management system instructs a selected bypass communication node to establish the bypass management communication link between the bypass node and the disconnected node whose management communication link has failed. Depending on the relationship between nodes, management communications sent using the bypass link may be secured. The bypass link in some implementations may include multiple bypass communication nodes linked together to provide a chain of bypass management communication links between the remote management system and the disconnected communication node.

13 Claims, 6 Drawing Sheets (56) References Cited

U.S. PATENT DOCUMENTS

2015/0009844 A1* 1/2015 Kneckt ............ H04W 52/0209
370/252
2015/0365994 A1* 12/2015 Yu .................... H04W 72/1268
370/336

* cited by examiner

WEARABLE GROUP COMMUNICATION DEVICE BYPASS CONNECTIVITY

RELATED APPLICATIONS

This application hereby claims the benefit of and priority to U.S. Provisional Patent Application 62/232,659, entitled "DENIED CONNECTIVITY AVAILABILITY FOR WEARABLE GROUP COMMUNICATION DEVICES," filed 25 Sep. 2015, and which is hereby incorporated by reference in its entirety.

TECHNICAL FIELD

Aspects of the disclosure are related to the field of communications and, in particular, to bypass connectivity for group communications.

TECHNICAL BACKGROUND

Various communication devices can be employed to facilitate communication between users. These devices can include cellular telephones, smartphones, discrete devices, computers, and tablets, among others, which provide an efficient way for users to communicate without being in the same physical location. Often it is desirable to group these communication devices together so that multiple users may easily communicate with each other while excluding from the group those not involved in the discussion. However, due to the limited nature of wireless communications, it is possible for one or more devices within one or more groups to lose contact with each other or with centralized management systems, which may result in lost communications for those devices.

OVERVIEW BACKGROUND

When a communication link fails between a remote management system and a communication node in a group communication system, a bypass communication link is established. When the link failure is detected, the remote management system can evaluate whether one or more additional communication nodes are available that can act as a bypass for management communications between the remote management system and the communication node whose management communication link has failed. After selecting a bypass communication node, the remote management system instructs the bypass communication node to establish a bypass management communication link between the bypass node and the node whose management communication link has failed.

If the original communication node and the bypass node are in the same communication group or are otherwise affiliated, management communications may be sent as usual. If the bypass communication node is outside a communication group to which the original communication node belongs, then the management communications sent using the bypass link may be secured (e.g., through encryption). Moreover, the bypass link in some implementations may include multiple bypass communication nodes linked together to provide a chain of bypass management communication links.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

In the examples below, personal communication nodes are discussed which allow group communication sessions among various users. These personal communication nodes can include discrete devices specialized for group communications that include one or more wireless transceivers and user interface elements tailored to streamlined group communications. The group communications can be initiated and altered by user intervention and/or automatically by a shared remote management system which can respond to one or more dynamic factors to form or change groups or group status. In some examples, one or more features of the discrete devices can be incorporated into other devices, such as personal communication devices which comprise cellular smartphones, gaming devices, personal computers, tablet computers, and the like. Voice command features can be included that comprise group forming and alteration features, keyword-based searching, productivity assistance, or navigation assistance, among other features. Further features can include conversational interaction for information transmittal or retrieval, such as activity reminders, weather, stocks, messaging, email, calendar, contacts, notes, music, clocks, web browsers, maps and other applications.

Once a group has been formed, communication nodes that are members of the group may exchange secure communications with each other while maintaining communication (e.g., via wireless and/or other connectivity) with a remote management system that configures and controls the group. However, if a member node loses communication and/or connectivity with the remote management system, that management system may no longer be able to update group configurations and/or provide other services. In order to prevent the disconnected member node from losing its functionality, bypass connectivity communication with the remote management system is provided securely, either through other member nodes within the group or through non-member nodes.

Figure 1:
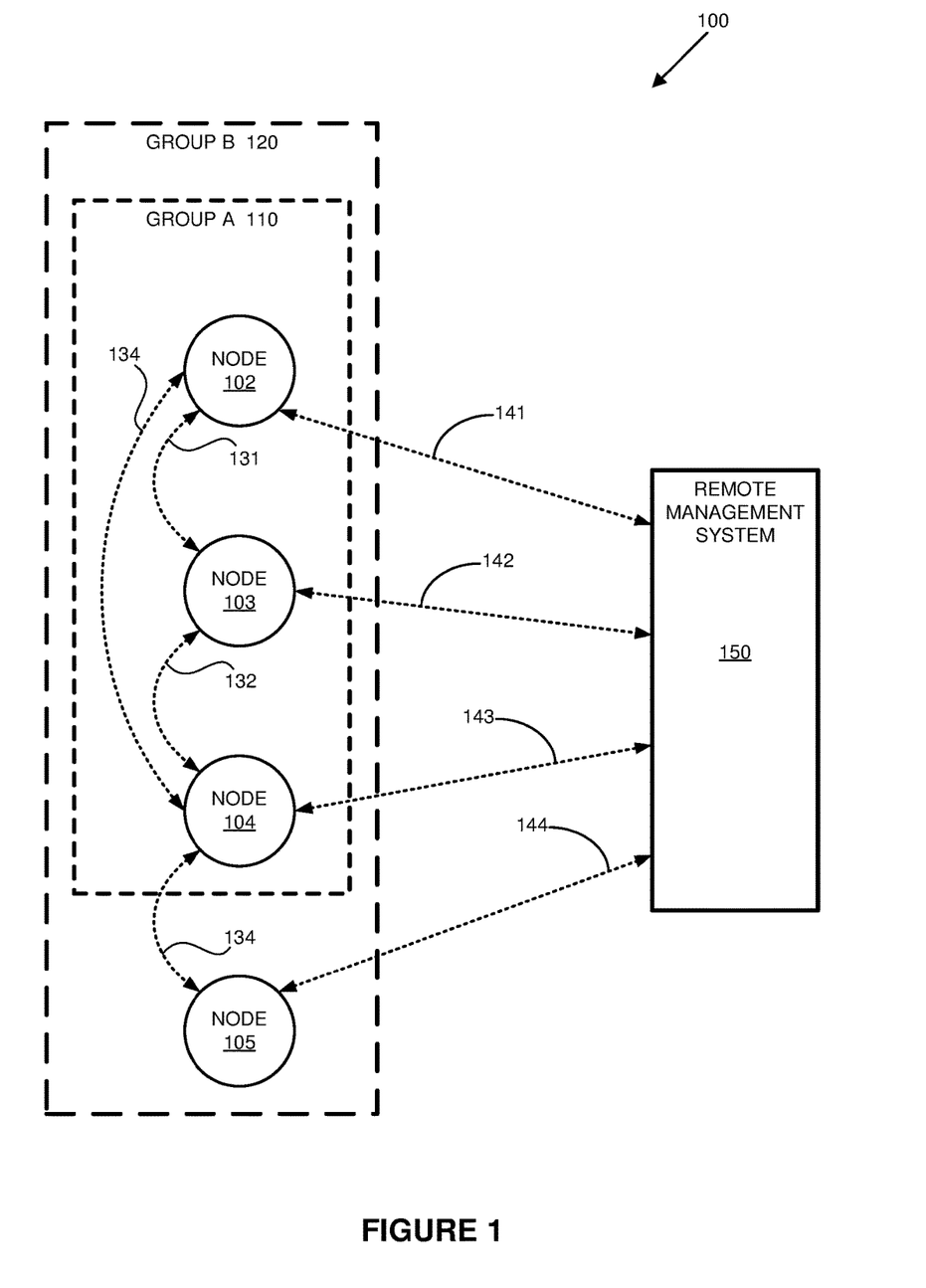
FIG. 1 illustrates a communication system.

In a first non-limiting example, FIG. 1 illustrates communication system 100, which can be employed to provide intelligent agent features for communication nodes 102-105. System 100 includes communication nodes 102-105, and remote management system 150. Communication nodes 102-105 typically operate in groups, such as Group A 110 and Group B 120 for example. These groups are defined by remote management system 150 (e.g., based on dynamic attributes communicated to remote management system 150 from communication nodes 102-105 or monitored by remote management system 150, or based on node user inputs). Group A 110 and Group B 120 can each comprise a nexus of specified communication nodes 102-105 for interactive communications, information sharing, data exchange, and other mutual exchange.

Communication nodes 102-105 may each comprise transceivers, audio transducers, processing systems, communication interfaces, environmental sensors, accelerometers, gyroscopes, Global Positioning System (GPS) receivers, user interfaces, and other systems. Remote management system 150 may comprise a computing system comprising one or more computing devices capable of managing services to a plurality of communication nodes, such as communication nodes 102-105.

Communication nodes 102-105 communicate with each other or with other communication nodes or intelligent agents over associated links 131-134. Communication links 131-134 can be used to connect communication nodes 102-105 to each other and/or to other personal communication nodes. In some examples, links 131-134 may comprise a mesh network among communication nodes 102-105. Communication nodes 102-105 can also communicate with remote management system 150 over associated ones of management communication links 141-144, which can comprise one or more network links in this example. Management communication links 141-144 connect communication nodes 102-105 to remote management system 150.

Links 131-134 and 141-144 can each comprise one or more wireless links that can each further include Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These links can carry any communication protocol suitable for wireless communications, such as Internet Protocol (IP) or Ethernet.

Furthermore, links 131-134 can comprise Bluetooth, IEEE 802.11 WiFi, infrared, ultrasonic, or any wireless communication format including combinations, variations or improvements thereof. Communication links 131-134 can each use air or space as the transport media. Additionally, links 141-144 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links 141-144 can each use metal, glass, optical, air, space, or some other material as the transport media. Communication links 131-134 and 141-144 may each be a direct link, or may include intermediate networks, systems, or devices, and may include a logical network link transported over multiple physical links.

In FIG. 1, each communication node 102-105 monitors one or more attributes from associated positional sensors, audio transducers, GPS receivers, accelerometers, wireless transceivers, environmental sensors, or other sensors or devices capable of monitoring the attributes discussed herein. These attributes comprise any data or information that may be used for dynamically forming and changing node groups, as well as for intelligent agent features for communication nodes 102-105. For example, one or more of the sound level of an environment, user preferences, proximity of one personal communication node to another, location, communication status, identity, and traveling speed may be attributes used for dynamically forming and changing groups of nodes as well as for intelligent agent features for communication nodes 102-105.

Communication nodes 102-105 periodically transfer messages for delivery to remote management system 150 (e.g., indicating dynamic changes in one or more attributes, user inputs, and/or other data useful in managing a node or a group). Communication nodes 102-105 may transfer a message to remote management system 150 whenever an attribute changes and/or at periodic intervals. Remote management system 150 can use dynamic changes in one or more attributes to form, modify and/or terminate groups of communication nodes 102-105 and for intelligent agent features for communication nodes 102-105. Although remote management system 150 and nodes 102-105 are each shown as separate entities in FIG. 1, it should be understood that features of remote management system 150 can be included in any of personal communication nodes 102-105.

A communication node may use secure communication methods for communicating with members of a communication group, with non-members and/or with a remote management system or the like. Secure communication methods include systems, techniques, protocols, methods and other approaches enabling users and nodes to securely share communications and other information with one another without interception or monitoring of the information or associated communications by non-members and/or third-party. Secure communication methods may comprise symmetric key encryption, asymmetric key encryption, public-key encryption, or some other type of encryption, including combinations thereof. The actual communications between personal communication nodes can employ secure communication methods, and the associated links can employ secure communication methods independently.

End to end encryption of communications, such as audio communications, can be established among members of the group. These end-to-end encrypted communications can include transport layer security (TLS) or secure sockets layer (SSL) communications, among other secure link types. For example, a secure communication session can be established among nodes 102-105 in Group B 120 of FIG. 1, as well as among nodes 102-104 in Group A 110.

Figure 2:
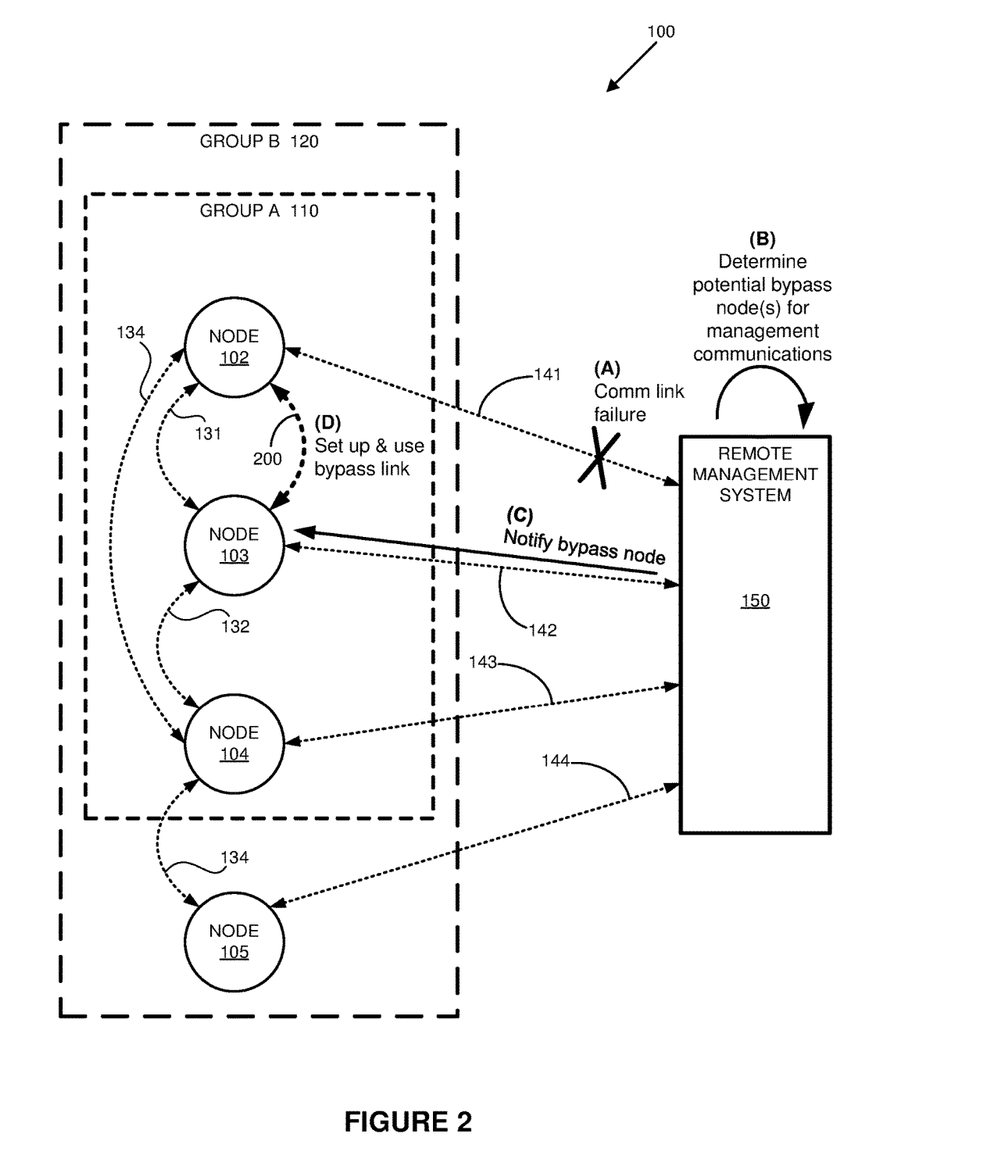
FIG. 2 illustrates a communication system.

FIG. 2 illustrates communication system 100 of FIG. 1, where management communication link 141 between node 102 and remote management system 150 has been disrupted or has failed (step (A)). The disruption can occur in wireless communications due to many factors, such as overloading of wireless network equipment, wireless signal fading, out-of-range conditions, weather, structures, movement, or other factors, including combinations thereof. In this example, remote management system 150 determines (step (B)) which communication node(s) can act as a bypass for the failed management communication link. Remote management system 150 identifies and communicates with node 103 (step (C)) and instructs node 103 to initiate management communications link 200 with node 102, where communication link 200 functions as a failover bypass of failed link 141. Node 103 then acts (step (D)) to relay communications between node 102 and remote management system 150 through bypass communication links 200 and 142. Since communication node 102 is in the same group (Group A 110) as communication node 103, there may be no security risk in having communication node 103 relay group-related communications between communication node 102 and remote management system 150.

Figure 3:
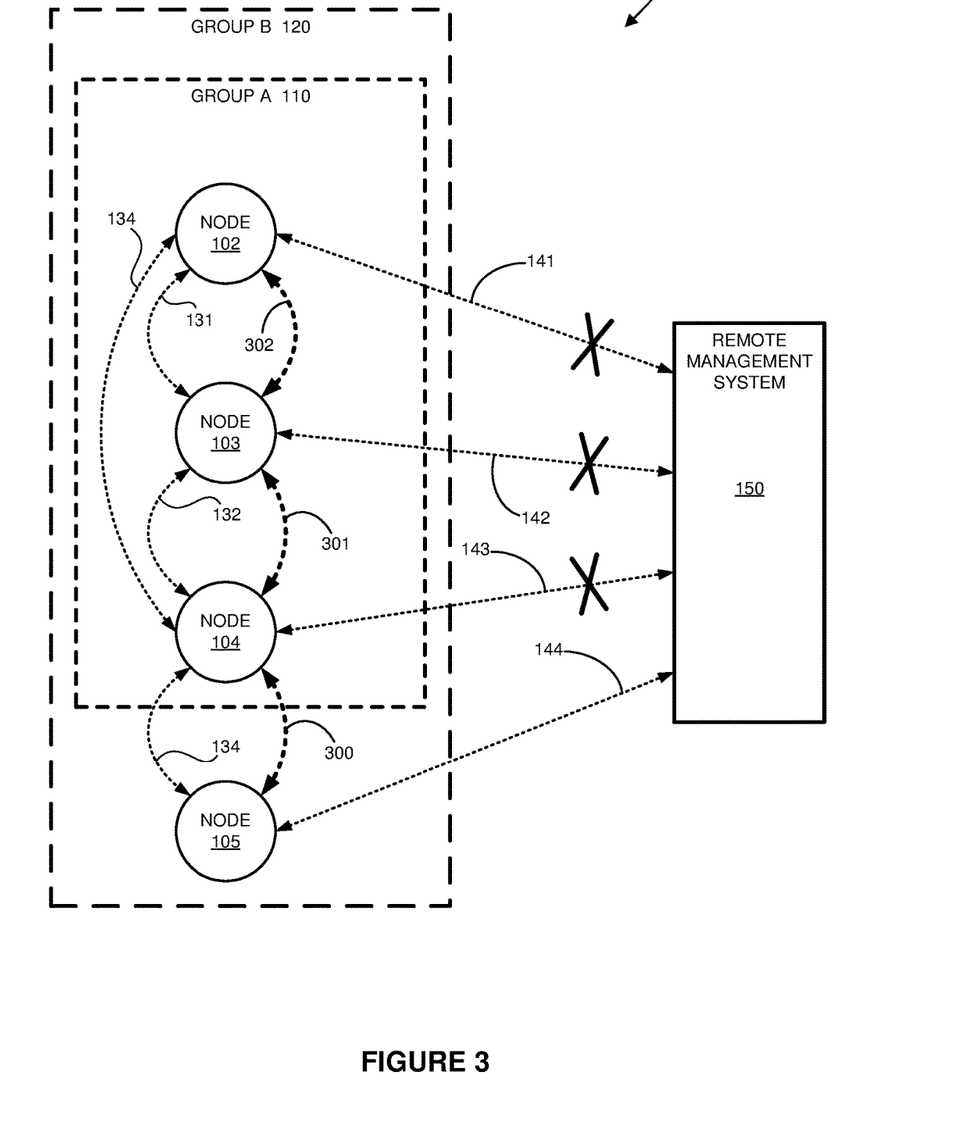
FIG. 3 illustrates a communication system.

FIG. 3 illustrates communication system 100 as shown in FIG. 1, where all of Group A 110'S management communication links (i e , management communication link 141 between communication node 102 and remote management system 150, management communication link 142 between communication node 103 and remote management system 150, and management communication link 143 between communication node 104 and remote management system 150) have been disrupted or have failed. In this example, remote management system 150 thus has lost contact with all members of Group A 110.

Since remote management system 150 still maintains one or more management communication links with communication nodes of other groups (e.g., Group B 120's communication node 105 through management communication link 144), remote management system 150 is able to instruct communication node 105 to configure a bypass to make contact with one or more of the communication nodes 102-104 in Group A 110 to resume management contact with Group A 110. Here, remote management system 150 instructs communication node 105 to open management communication link 300 to communication node 104. Management communication link 300 can be encrypted so that communication node 105 is unable to decode communications between node 104 and remote management system 150. Remote management system 150 is thus able to communicate with node 104 via non-member bypass management link 300 and instruct node 104 to open member bypass management communication link 301 with node 103. Remote management system 150 is then able to communicate with communication node 103 and instruct node 103 to open member bypass management communication link 302 with node 102. In other examples, communication node 104 may open communication links with both node 103 and node 102 so that node 103 is not required to forward communications from node 102 to node 104.

Figure 4:
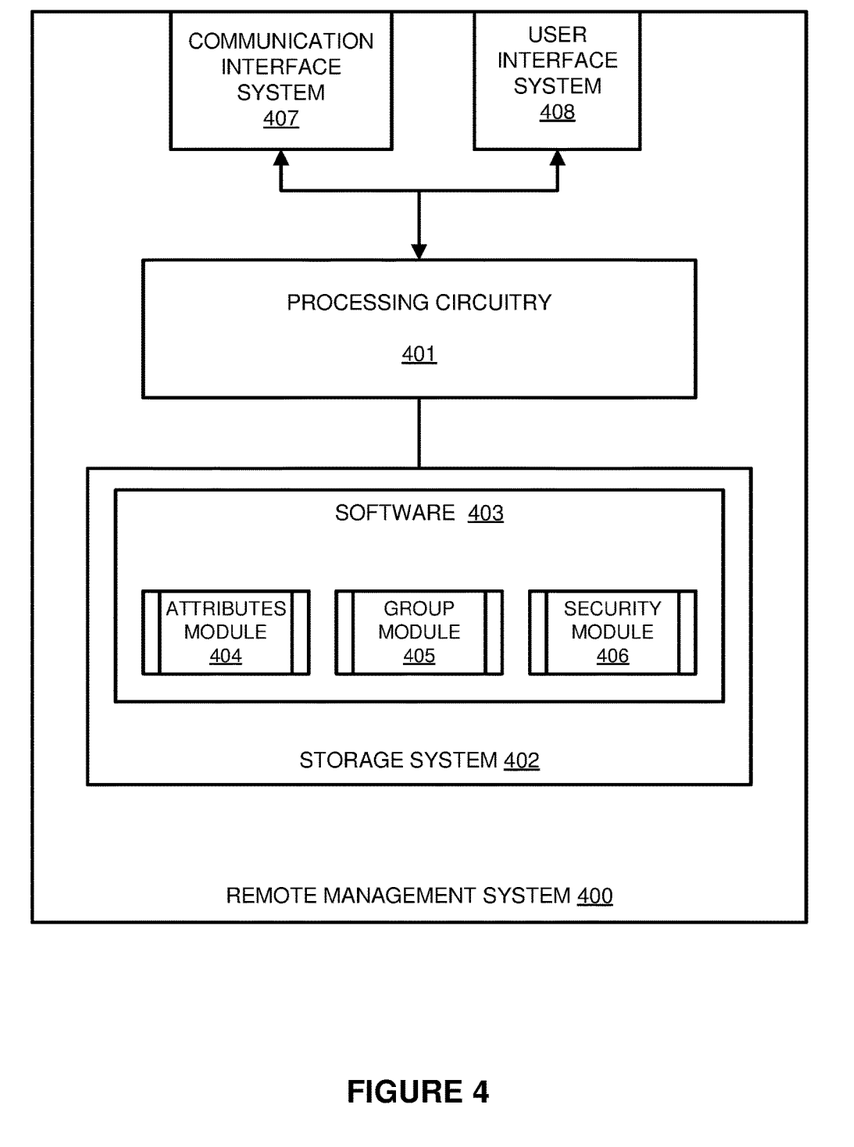
FIG. 4 illustrates a remote management system.

FIG. 4 illustrates one or more implementations of a remote management system 400. System 400 is a non-limiting example (e.g., of a computing environment that can execute features of remote management system 150 of FIG. 1 and/or remote management systems discussed herein). Furthermore, elements of remote management system 400 can be distributed over one or more computing devices (including one or more communication nodes). Remote management system 400 includes processing circuitry 401, storage system 402, software 403, communication interface system 407, and user interface system 408.

It may be understood that remote management system 400 is generally intended to represent one or more computing systems on which software 403 may be deployed and executed (e.g., in order to implement remote management system 150). However, remote management system 400 may also be suitable as any computing system on which software 403 may be staged and from where one or both may be distributed, transported, downloaded, or otherwise provided to yet another computing system for deployment and execution, or yet additional distribution.

Communication interface system 407 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 408 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 408. In some cases, the input and output devices may be combined in a single device, such as a display capable of displaying images and receiving touch gestures.

User interface system 408 may also include associated user interface software executable by processing circuitry 401 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces may be input via user interface system 408.

Communication between remote management system 400 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

Processing circuitry 401 can comprise one or more microprocessors and other processing circuitry that retrieves and executes software 403 from storage system 402. Processing circuitry 401 can be implemented within a single processing device but can also be distributed across multiple processing devices or sub-systems that cooperate in executing program instructions. Examples of processing circuitry 401 include general purpose central processing units, application specific processors, and logic devices, as well as any other type of processing device, combinations, or variations thereof. In some examples, portions of processing circuitry 401 is physically separate from some elements of remote management system 400 and area included in remote servers, cloud-based processing systems, or virtualized computing systems.

Storage system 402 can comprise any non-transitory computer readable storage media capable of storing software 403 that is executable by processing circuitry 401. Storage system 402 can also include various data structures which comprise one or more databases, tables, lists, or other data structures. Storage system 402 can include volatile and nonvolatile, removable and non-removable media implemented in any method or technology for storage of information, such as computer readable instructions, data structures, program modules, or other data. Storage system 402 can be implemented as a single storage device but can also be implemented across multiple storage devices or subsystems co-located or distributed relative to each other. Storage system 402 can comprise additional elements, such as a controller, capable of communicating with processing circuitry 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 403 can be implemented in program instructions and among other functions can, when executed by remote management system 400 in general or processing circuitry 401 in particular, direct remote management system 400, or processing circuitry 401 to operate as described herein for a remote management system or other functional systems. Software 403 can include additional processes, programs, or components, such as operating system software, database software, or application software. Software 403 can also comprise firmware or some other form of machine-readable processing instructions executable by elements of processing circuitry 401.

In at least one implementation, the program instructions can include attributes module 404, group module 405, and security module 406. Attributes module 404 monitors one or more attributes of communication nodes (e.g., transferring messages for delivery to a management system indicating dynamic changes in one or more attributes). These attributes and dynamic changes in attributes can be used to form and change dynamic communication groups among communication nodes and intelligent agent nodes. Attributes module 404 may periodically or continuously monitor attributes associated with communication node sensors or communication nodes may send messaging or alerts to attributes module 404 when changes are detected. Attributes module 404 receives attributes (e.g., from communication nodes 102-105) and transmits attributes (e.g., to communication nodes 102-105 over management communication links 141-144).

Group module 405 monitors group membership status among communication nodes, and changes the group membership of communication nodes (e.g., based on the attributes and the group membership status). Group module 405 further monitors management communication links (e.g., between remote management system 150 and associated communication nodes 102-105 in implementations such as the one shown in FIG. 1). When a management communication link failure is detected, group module 405 determines an identity of a bypass communication node that can be used to communicate with communication nodes that have been disconnected due to the management communication link failure. Group module 405 then directs the bypass communication node to establish a management communication link with the communication node that has experienced the communication link failure. This enables the bypass communication node to forward management communications between remote management system 400 and the communication node experiencing the communication link failure.

Security module 406 initiates, controls, and maintains secure communications between remote management system 400 and associated communication nodes, and among communication nodes. For example, when group module 405 identifies a bypass communication node that is external to a group of communication nodes whose management communication links with remote management system 400 have failed, security module 406 establishes secure communication links through the bypass communication node between management system 400 and the group of disconnected communication nodes. This enables the bypass communication node to act as a conduit to forward communications between the remote management system 400 and the other group of communication nodes without having the ability to decode the communications.

In general, software 403 can, when loaded into processing circuitry 401 and executed, transform processing circuitry 401 overall from a general-purpose computing system into a special-purpose computing system customized to operate as described herein for a remote management system, among other operations. Encoding software 403 on storage system 402 can transform the physical structure of storage system 402. The specific transformation of the physical structure can depend on various factors in different implementations of this description. Examples of such factors can include, but are not limited to the technology used to implement the storage media of storage system 402 and whether the computer-storage media are characterized as primary or secondary storage. For example, if the computer-storage media are implemented as semiconductor-based memory, software 403 can transform the physical state of the semiconductor memory when the program is encoded therein. For example, software 403 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 5:
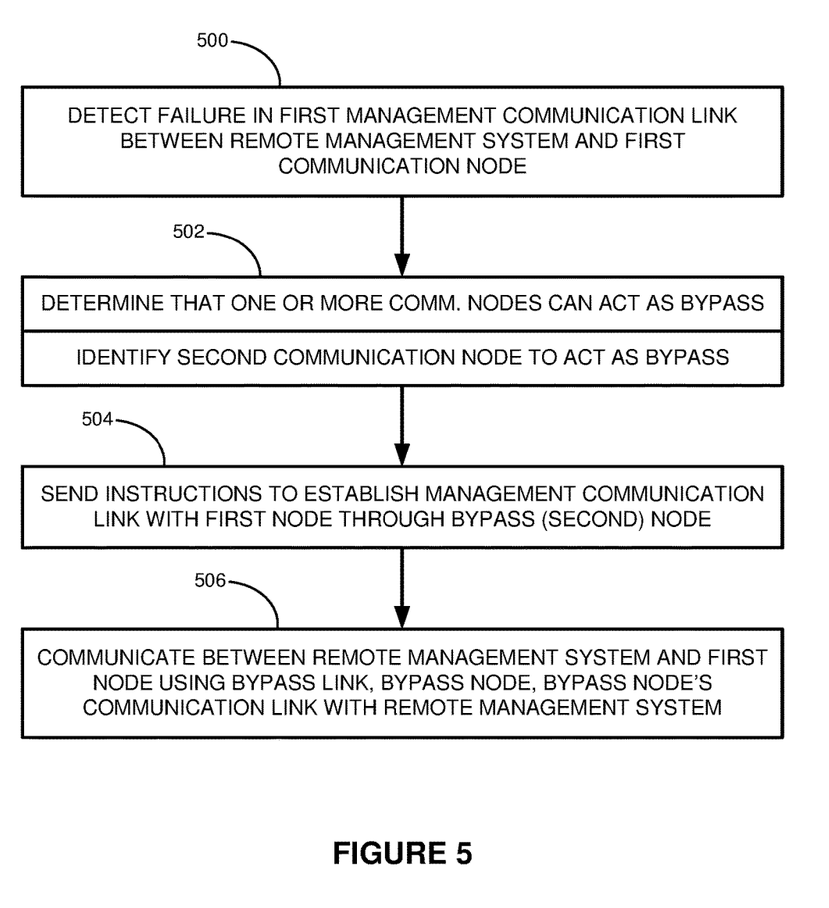
FIG. 5 illustrates a method for operating a remote management system.

FIG. 5 illustrates a method for operating a remote management system (e.g., remote management system 150 as illustrated in one or more of the Figures). A remote management system detects a failure in a first management communication link used for communications between a first communication node and the remote management system (operation 500). The remote management system then determines that one or more additional communication nodes are capable of acting as a bypass communication node and identifies a second communication node as such (operation 502).

The remote management system transmits instructions to establish a bypass management communication link with the first communication node (operation 504) and subsequently communicates with the first node through the bypass management communication link (e.g., as shown with link 200 of FIG. 2), the second (bypass) communication node (e.g., node 103 of FIG. 2), and the second node's communication link (e.g., link 142 of FIG. 2) with the remote management system (operation 506). Operation 504 can be performed by having the second (bypass) communication node set up the bypass management communication link directly with the first communication node. In other implementations the bypass instructions may include the second node establishing a bypass management communication link with a third communication node and that third node establishing an additional bypass management communication link with the first communication node (directly or through one or more additional communication nodes acting as bypass nodes), creating a multiple bypass node chain somewhat similar to the implementation(s) shown in FIG. 3.

Figure 6:
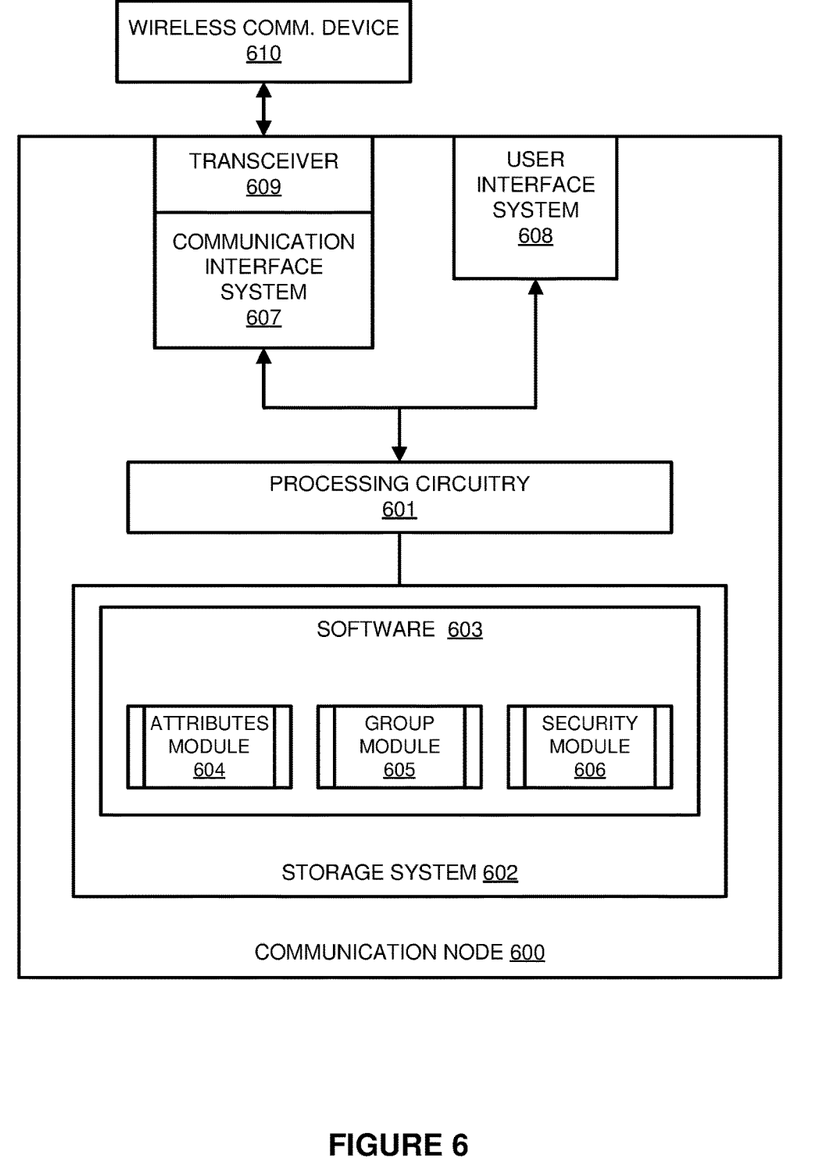
FIG. 6 illustrates a communication node.

FIG. 6 illustrates one or more implementations of a communication node 600. Communication node 600 is a non-limiting example (e.g., of a computing environment that can execute features of communication nodes 102-105 of FIG. 1 and/or communication nodes discussed herein). Furthermore, elements of communication node 600 can be distributed over one or more computing devices. Communication node 600 includes processing circuitry 601, storage system 602, software 603, communication interface system 607, and user interface system 608.

It may be understood that communication node 600 is generally intended to represent one or more computing systems on which software 603 may be deployed and executed (e.g., in order to implement communication nodes 102-105). However, communication node 600 may also be suitable as any computing system on which software 603 may be staged and from where one or both may be distributed, transported, downloaded, or otherwise provided to yet another computing system for deployment and execution, or yet additional distribution.

In this example, wireless communication device 610 is shown separate and independent from communication node 600. Wireless communication device 610 may comprise a smartphone, tablet device, computer, gaming device, laptop computer, or some other communication device capable of communicating using packet networks or some other communication network. In another example, communication node 600 may be incorporated as software within wireless communication device 610. In other examples communication node 600 may be a discrete node that communicates through wireless communication device 610 such as a Bluetooth device to a smartphone and cellular service from the smartphone to other communication nodes and remote management system 150.

Communication interface system 607 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

Communication interface system 607 further comprises transceiver 609 for communicating with wireless communication device 610. Transceiver 609 comprises communication components, such as ports, signal processing circuitry, memory, software, and the like. Transceiver 609 communicates with wireless communication device 610 over a link that may comprise a Bluetooth communication link, WiFi link, infrared, ultrasonic or any other communication link between communication node 600 and wireless communication device 610.

User interface system 608 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 608. In some cases, the input and output devices may be combined in a single device, such as a display capable of displaying images and receiving touch gestures.

User interface system 608 may also include associated user interface software executable by processing circuitry 601 in support of the various user input and output devices discussed above. In communication node 600, user interface system 608 is optional as some embodiments of communication node 600 do not require any user interaction. Separately or in conjunction with each other and other hardware and software elements, the user interface software and user interface devices may support a graphical user interface, a natural user interface, or any other type of user interface. In addition, user input made with respect to the user interfaces may be input via user interface system 608.

Communication between communication node 600 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

Processing circuitry 601 can comprise one or more microprocessors and other processing circuitry that retrieves and executes software 603 from storage system 602. Processing circuitry 601 can be implemented within a single processing device but can also be distributed across multiple processing devices or sub-systems that cooperate in executing program instructions. Examples of processing circuitry 601 include general purpose central processing units, application specific processors, and logic devices, as well as any other type of processing device, combinations, or variations thereof. In some examples, portions of processing circuitry 601 is physically separate from some elements of communication node 600 and area included in remote servers, cloud-based processing systems, or virtualized computing systems.

Storage system 602 can comprise any non-transitory computer readable storage media capable of storing software 603 that is executable by processing circuitry 601. Storage system 602 can also include various data structures which comprise one or more databases, tables, lists, or other data structures. Storage system 602 can include volatile and nonvolatile, removable and non-removable media implemented in any method or technology for storage of information, such as computer readable instructions, data structures, program modules, or other data. Storage system 602 can be implemented as a single storage device but can also be implemented across multiple storage devices or sub-systems co-located or distributed relative to each other. Storage system 602 can comprise additional elements, such as a controller, capable of communicating with processing circuitry 601. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 603 can be implemented in program instructions and among other functions can, when executed by communication node 600 in general or processing circuitry 601 in particular, direct communication node 600, or processing circuitry 601 to operate as described herein for a communication node among other functional systems. Software 603 can include additional processes, programs, or components, such as operating system software, database software, or application software. Software 603 can also comprise firmware or some other form of machine-readable processing instructions executable by elements of processing circuitry 601.

In at least one implementation, the program instructions can include attributes module 604, group module 605, and security module 606. Attributes module 604 monitors one or more attributes of communication nodes (e.g., transferring messages for delivery to a remote management system (e.g., system 150) indicating dynamic changes in one or more attributes). These attributes and dynamic changes in attributes can be used to form and change dynamic communication groups among communication nodes and intelligent agent nodes. Attributes module 604 may periodically or continuously monitor attributes associated with communication node sensors or communication nodes may send messaging or alerts to attributes module 604 when changes are detected. Attributes module 604 receives attributes (e.g., from remote management system 150) and transmits attributes (e.g.) to remote management system 150 over management communication links 141-144).

Group module 605 monitors group membership status among communication nodes, and changes the group membership of communication nodes (e.g., based on the attributes and the group membership status). Group module 605 further receives instructions (e.g., from remote management system 150) related to groups in which it is a member. In one non-limiting example, remote management system 150 detects a management communication link failure and determines an identity of a bypass communication node (e.g., from one or more nodes capable of acting as a bypass node) that may be used to communicate with communication nodes that have been disconnected due to the management communication link failure. Group module 605 then receives direction from the remote management system directing the communication node to operate as a bypass management communication node and to establish a management communication link with the communication node that has experienced the communication link failure. This enables the bypass communication node to act as a conduit to forward communications between a remote management system and the communication node experiencing the communication link failure.

Security module 606 initiates, controls, and maintains secure communications between communication node 600 and other communication nodes 102-105 (e.g., management communications between node 600 and a remote management system). For example, when communication node 600 operates as a bypass communication node that is external to the group of communication nodes whose communication link(s) with a remote management system have failed, security module 606 establishes secure management communication links between the bypass communication node and any disconnected communication nodes. This enables the bypass communication node to forward management communications between the remote management system and the disconnected communication nodes without having the ability to decode the communications.

In general, software 603 can, when loaded into processing circuitry 601 and executed, transform processing circuitry 601 overall from a general-purpose computing system into a special-purpose computing system customized to operate as described herein for a communication node and/or to perform other operations. Encoding software 603 on storage system 602 can transform the physical structure of storage system 602. The specific transformation of the physical structure can depend on various factors in different implementations of this description. Examples of such factors can include, but are not limited to the technology used to implement the storage media of storage system 602 and whether the computer-storage media are characterized as primary or secondary storage. For example, if the computer-storage media are implemented as semiconductor-based memory, software 603 can transform the physical state of the semiconductor memory when the program is encoded therein. For example, software 603 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a remote management system, wherein the remote management system manages a first communication node group comprising a plurality of first group communication nodes, the method comprising:

detecting failure of a plurality of first group management communication links between the remote management system and the first communication node group such that the remote management system has lost contact with the first communication node group, wherein the plurality of first group management communication links comprises a plurality of individual direct and disjoint communication connections between the remote management system and each respective first group communication node;

in response to detection of the failure of the plurality of first group management communication links;

determining, at the remote management system, a bypass communication node, wherein the bypass communication node is not one of the plurality of first group communication nodes;

establishing a first bypass management communication link between the remote management system and a bypass communication node;

transmitting instructions to the bypass communication node to establish a second bypass management communication link between the bypass communication node and a first communication node, wherein the plurality of first group communication nodes comprises the first communication node; and     the remote management system communicating with the first communication node through the first and second bypass management communication links.

2. The method of claim 1 wherein the remote management system communicates with the first communication node through the first and second bypass management communication links using end-to-end secure management communications sent from the remote management system via the bypass communication node and the first and second bypass communication links.

3. The method of claim 1 wherein the first communication node group further comprises a second communication node;
  further wherein transmitting instructions to establish a second bypass management communication link between the bypass communication node and the first communication node comprises:
    sending instructions to the bypass communication node to establish a third bypass management communication link between the bypass communication node and the second communication node; and
    sending instructions to the second communication node to establish a fourth bypass management communication link between the second communication node and the first communication node;
    wherein the second bypass management communication link comprises the third and fourth bypass management communication links.

4. The method of claim 1 wherein each communication node comprises a wireless communication device.

5. The method of claim 4 wherein each wireless communication device comprises a cellular smartphone, gaming device, personal computer, or tablet computer.

6. A remote management system for managing group communications among a first communication node group comprising a plurality of first group communication nodes, the system comprising:
  one or more processors;
  a non-transitory computer readable storage medium having instructions stored thereon that, when executed by the one or more processors, cause the management system to:
    detect failure of a plurality of first group management communication links between the remote management system and the first communication node group, such that the remote management system has lost contact with the first communication node group, wherein the plurality of first group management communication links comprises a plurality of individual direct and disjoint communication connections between the remote management system and each respective first group communication node;
    in response to detection of the failure of the plurality of first group management communication links:
      determine, at the remote management system, a bypass communication node, wherein the bypass communication node is not one of the plurality of first group communication nodes;
      establish a first bypass management communication link between the remote management system and a bypass communication node, wherein the bypass communication node is not one of the plurality of first group communication nodes;
      transmit instructions to the bypass communication node to establish a second bypass management communication link between the bypass communication node and a first communication node, wherein the plurality of first group communication nodes comprises the first communication node; and
      communicate with the first communication node through the first and second bypass management communication links.

7. The system of claim 6 wherein the remote management system communicates with the first communication node through the first and second bypass management communication links using end-to-end secure management communications sent from the remote management system the bypass communication node and the first and second bypass communication links.

8. The system of claim 6 wherein the first communication node group further comprises a second communication node;
  further wherein transmitting instructions to establish a second bypass management communication link between the bypass communication node and the first communication node comprises:
    sending instructions to the bypass communication node to establish a third bypass management communication link between the bypass communication node and the second communication node; and
    sending instructions to the second communication node to establish a fourth bypass management communication link between the second communication node and the first communication node;
    wherein the second bypass management communication link comprises the third and fourth bypass management communication links.

9. The system of claim 6 wherein each communication node comprises a wireless communication device.

10. The system of claim 9 wherein each wireless communication device comprises a cellular smartphone, gaming device, personal computer, or tablet computer.

11. A method of operating a remote management system, wherein the remote management system manages group communications among members of a first communication node group, the method comprising:
  detecting a failure of a management communication link between the remote management system and the first communication node group, such that the remote management system has lost contact with the first communication node group, wherein the first communication node group comprises a plurality of communication nodes including a first communication node, and wherein each of the plurality of communication nodes comprises an individual direct and disjoint communication connection between the remote management system and each respective communication node;
  in response to detection of the established management communication link failure: determining, at the remote management system, a bypass management communication node, wherein the first communication node group does not comprise the bypass communication node;
  establishing a first bypass management communication link, the first bypass management communication link being direct and disjoint between the remote management system and the bypass communication node;
  instructing the bypass communication node to establish a second bypass management communication link with the first communication node, wherein the second bypass management communication link is direct and disjoint; and
  the remote management system communicating with the first communication node through the first and second bypass management communication links.

12. The method of claim 11 wherein each communication node comprises a wireless communication device.

13. The method of claim 12 wherein each wireless communication device comprises a cellular smartphone, gaming device, personal computer, or tablet computer.

* * * * *